United States Patent [19]

Brantmark et al.

[11] Patent Number: 5,608,619

[45] Date of Patent: Mar. 4, 1997

[54] ROBOT CONTROL SYSTEM

[75] Inventors: Håkan Brantmark; Peter Eriksson; Sven-Erik Johansson; Ingemar Reyier, all of Västerås, Sweden

[73] Assignee: Asea Brown Boveri AB, Vasteras, Sweden

[21] Appl. No.: 402,502

[22] Filed: Mar. 13, 1995

[30] Foreign Application Priority Data

Mar. 25, 1994 [SE] Sweden .................................. 9401012

[51] Int. Cl.⁶ .................................................. G05B 19/42
[52] U.S. Cl. .............................. 364/192; 395/92; 395/99; 318/568.13
[58] Field of Search .................................. 364/192, 191, 364/190, 424.01; 395/80, 92, 99; 318/568.13

[56] References Cited

U.S. PATENT DOCUMENTS

| | | | |
|---|---|---|---|
| 4,550,383 | 10/1985 | Sugimoto | 364/191 |
| 4,553,077 | 11/1985 | Brantmark et al. | 395/80 |
| 5,023,788 | 6/1991 | Kitazume et al. | 364/424.01 |

Primary Examiner—Roy N. Envall, Jr.
Assistant Examiner—Karen D. Presley
Attorney, Agent, or Firm—Watson Cole Stevens Davis, P.L.L.C.

[57] ABSTRACT

The invention relates to a control system for an industrial robot adapted for storage of user programs which comprise a series of robot instructions. At least one of the robot instructions is arranged as a shell instruction, which constitutes a call to a shell routine (20). The shell routine is associated with a plurality of optional attributes (21a, 21b, 21c) and comprises

- a forward list (22) comprising a first set of robot instructions; and
- a backward list (23) comprising a second set of robot instructions.

The control system comprises a program executor adapted, for forward running of a user program, to execute the shell instructions in accordance with the forward list and, for running the user program backwards, to execute the shell instructions in accordance with the backward list.

The invention also relates to a method for controlling an industrial robot. The method comprises creating a plurality of shell routines and testing them in advance. When producing user programs, shell instructions are used which constitute calls to the shell routines created in advance. The user programs are executed by the program executor, and for forward running the shell instructions are carried out in accordance with the forward list, and for backward running the shell instructions are carried out in accordance with the backward list. (FIG. 3)

5 Claims, 5 Drawing Sheets

ROBOT CONTROL SYSTEM

TECHNICAL FIELD

The present invention relates to a control system industrial robot which is adapted for programming in a robot language. The control system comprises a program storage for storage of a user program which consists of a series of instructions in the robot language, and a program executor adapted, when running the program, to execute the stored instructions.

The invention also relates to a method for controlling an industrial robot comprising a control system according to the invention.

BACKGROUND ART

When an industrial robot is to be put into operation for a certain task, for example spot welding, it must be programmed to carry out the task. During spot welding the robot is to move in the fastest possible way between a large number of fixed points and, at each point, carry out a welding operation. To have a starting point for the programming of the robot, the positions of the welding points are calculated in advance. However, this calculation only provides a rough estimate of the accurate positions of the points. A robot program for spot welding comprises a series of robot instructions which instruct the robot as to what points to move to, how it should move between the points, and what to do at the points. Before it is possible to start using the robot program, it has to be test-run. A number of things have to be corrected in the robot program before it is finished, for example the positions of the points and the speed at which the robot is to move between the points. During the test run the robot program is stepped such that one instruction at a time can be test run. After carrying out a change in a robot instruction, the robot program must be capable of being reversed such that the changed instruction can be test run again. Repeated changes in the instruction may be needed before it is approved.

To make it simple to try out a finished robot program, it is a requirement for the robot program to be able to be run step-by-step both in the forward and the backward direction. When a robot instruction is run backwards, it is not always to carry out the same operation as when it is run forwards. In, for example, spot welding, a welding instruction which is run forwards may comprise the following steps:

1) open welding gun,
 2) move robot to next given spot,
 3) close welding gun,
 4) weld.

If the same welding instruction is run backwards, it is to comprise the following steps:

1) open welding gun,
 2) move robot back to preceding point.

The above example shows that when reversing an instruction, it does not function merely to carry out the steps of the instruction in the reverse order, but a completely different set of instructions are needed for running backwards.

When programming an industrial robot, usually some form of robot language is used. The robot language is formed such that it is simple to use for the robot user, who may be a person without knowledge or experience of programming. An instruction in the robot language, a robot instruction, consists of a call to a routine which comprises a set of instructions written in some programming language. The traditional way of developing a robot language means that the robot manufacturer himself develops the robot language while using a general high-level language. A robot instruction then consists of a call to a set of instructions written in the high-level language. Developing a robot instruction in high-level language, a so-called fixed robot instruction, requires on the one hand a programmer with sufficient knowledge of the high-level languages, and on the other hand that the development is carried out in a system development environment on an external computer. A fixed robot instruction is supplied by the robot manufacturer, and it cannot be changed by a robot user who has neither knowledge of the high-level language nor access to the external computer.

A robot is used in a wide variety of applications, for example spray-painting, welding, and assembly. Each application has its specific need of robot instructions. It is impossible for the robot manufacturer to develop robot instructions for all of these different needs. It is, therefore, desirable both for the robot manufacturer and the robot user to be able to develop new robot instructions in a simple way without having to use traditional system development.

SUMMARY OF THE INVENTION, ADVANTAGES

The object of the invention is to enable a person without knowledge of high-level programming and without access to an external computer to obtain new robot instructions in a rapid and simple manner.

The invention relates to a control system for an industrial robot. The control system comprises a program storage which is adapted for storage of user programs which comprise a series of robot instructions. At least one of the robot instructions is arranged as a so-called shell routine. The shell routine is associated with a number of optional attributes and comprises

- a forward list, i.e. an instruction sequence, comprising a first set of robot instructions; and
- a backward list comprising a second set of robot instructions.

The control system also comprises a program executor which is adapted, for forward running of a user program comprising so-called shell instructions, to execute the shell instructions in accordance with the forward list, and, for running the user program backwards, to execute the shell instructions in accordance with the backward list.

The invention also relates to a method for control of an industrial robot. The method entails creating and testing a number of shell routines in advance. The finished shell routines are stored in the program storage. When producing user programs, shell instructions are used which constitute calls to the shell routines created in advance. The user programs are executed by the program executor, and when running forwards, the shell instructions are executed in accordance with the forward list and when running backwards, the shell instructions are executed in accordance with the backward list.

A shell instruction is a robot instruction which, instead of constituting a call to a series of instructions written in a high-level language, constitute a call to a series of instructions written in the robot language itself. One advantage of the invention is that the robot users themselves may develop their own instructions and that the robot manufacturer can supply instructions in which the user himself can make changes.

The invention also facilitates the production of fixed routines, since a prototype can first be developed and test run as a shell routine and then, when it functions, be rewritten as a fixed routine.

The optional attribute may be set such that a shell routine behaves just like a fixed routine. An operator running a user program will not notice any difference when running a shell instruction compared with when running a fixed robot instruction.

DESCRIPTION OF THE PREFERRED EMBODIMENTS

Figure 1:
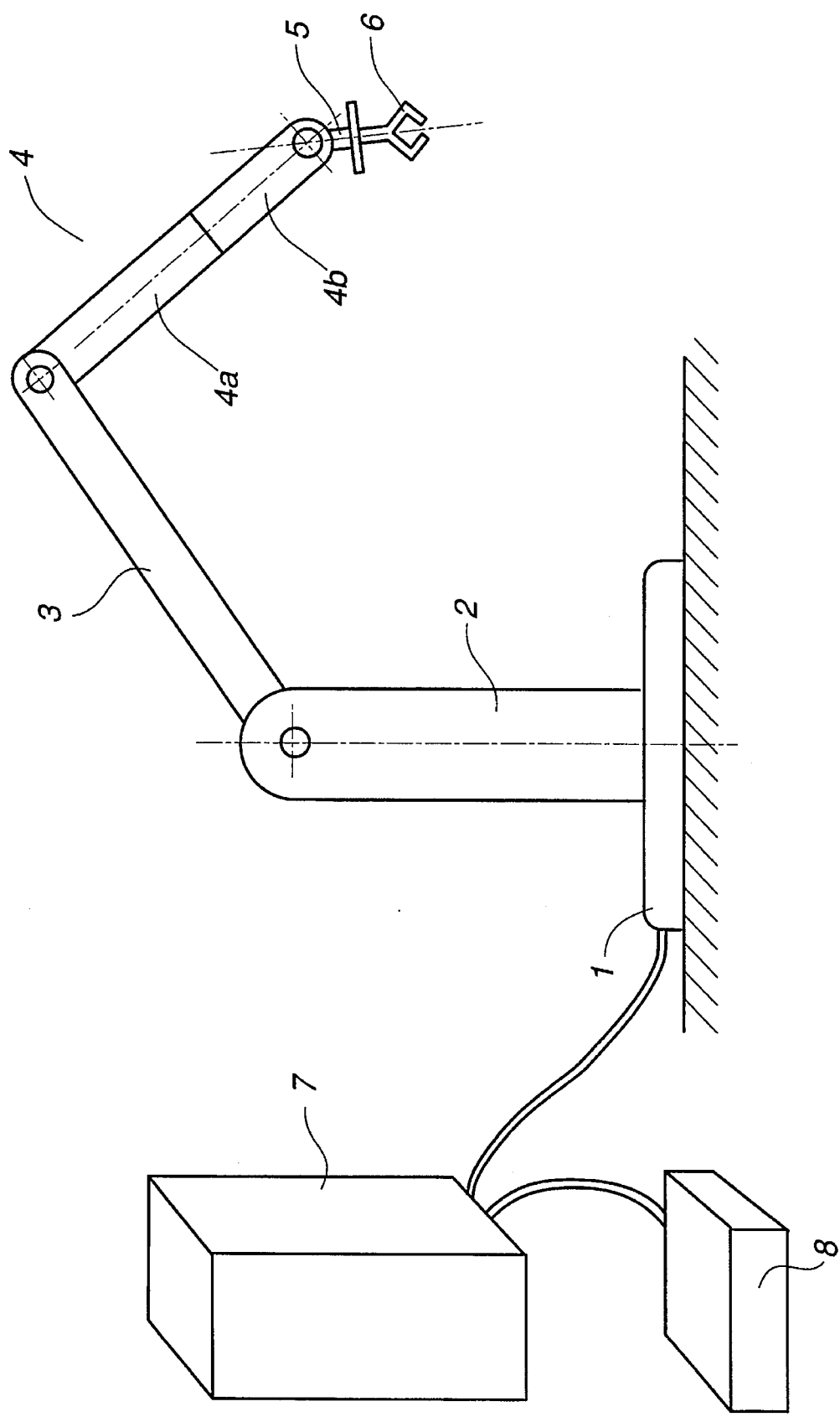
FIG. 1 schematically shows an industrial robot to which the invention may be applied.

FIG. 1 shows an example of a known industrial robot. The mechanical part of the robot comprises a fixed bottom plate 1, in relation to which the lower part 2 of the robot is rotatable about a vertical axis. The lower arm 3 of the robot is rotatable in relation to the lower part 2 about a horizontal axis. The upper arm 4 of the robot is rotatable in relation to the lower arm about a second horizontal axis. The robot arm 4 consists of two parts 4a and 4b, the outer part 4b being rotatable in relation to the inner part 4a about a rotary axis coinciding with the longitudinal axis of the arm. At the outer end of the upper arm 4a, the hand 5 of the robot is mounted, which may be rotatable in, for example, two or three degrees of freedom in relation to the arm 4. A working tool 6 is attached to the robot hand, and as schematically shown in the figure this working tool may consist of a gripper, or alternatively a welding device, a glue gun, or a measuring tool.

The mechanical part of the robot is connected, via a cable, to the control system 7 which comprises the electronic, computer, and drive equipment which is required for control of the mechanical part of the robot. The control unit is connected to a programming unit 8 for programming and other operation of the robot.

Figure 2:
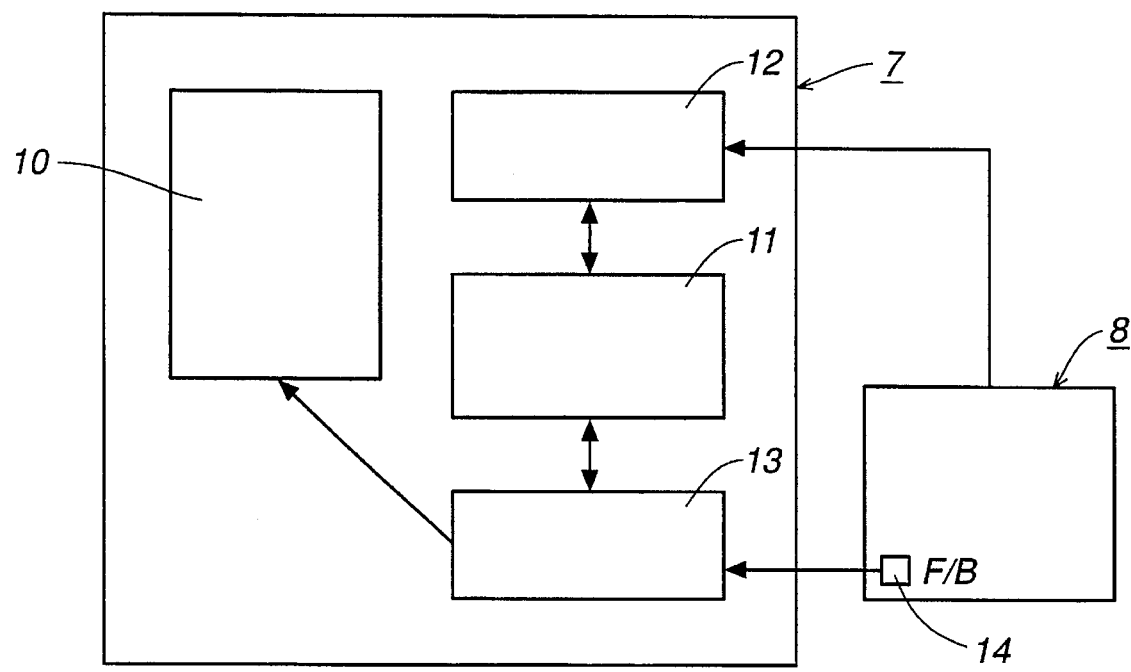
FIG. 2 schematically shows part of a control system according to the invention.

FIG. 2 shows those parts of the control system 7 which are of interest to the invention. A user program comprises a set of robot instructions. According to the invention, a robot instruction may be of two types, fixed robot instructions and so-called shell instructions. The fixed robot instructions consist of calls to fixed routines, which comprise a set of instructions written in a general high-level language, for example C or Pascal. A fixed routine is developed and translated into machine code in an external computer, whereupon it is stored in an application library 10. Shell instructions consist of calls to so-called shell routines, which comprise a set of robot instructions. A shell routine is translated into an intermediate code by a compiler 12 and is then stored in the program storage 11. In the same way, a user program is translated by the compiler and stored into the program storage. The user program is executed by a program executor 13. Depending on the type of instruction that is to be executed, the program executor retrieves routines from the application library or from the program storage. The programming unit 8 is provided with a button 14 for setting the program to run forwards or backwards.

The tasks of a robot user can be divided into two groups, namely, those of a program preparer and those of an operator. The tasks of the program preparer are, among other things, to develop new user programs and to make changes in existing programs before new applications. The tasks of the operator mainly comprise running the user programs, for example, starting, stopping and reversing them, and to make minor changes in the programs. The program preparer and the operator are normally different persons. In those cases when the program preparer and the operator are not the same person, it is important that all the robot instructions behave in the same way to the operator, irrespective of whether they are developed in the traditional way or written in the robot language itself.

One condition for the invention to be applicable to a robot is that the robot has a robot language which allows procedure calls with arguments, and that it is possible to link attributes to procedures. An attribute is a property which may be imparted to the shell routine, and each attribute may be switched on or off, i.e. activated or deactivated, as required. Usually, the attributes are switched off during development and testing of the routine, that is, as long as there is a need to make a change in the routine. When the routine is considered to be finished, the attributes are switched on. One important property of a shell instruction is that an operator who is running a user program does not notice any difference between a shell routine and a fixed robot instruction.

To obtain this, the shell routine must be provided with two important attributes, namely, "view-only" and "no-step in". If the attribute "view-only" is switched on, this means that the shell routine can only be read, that is, it is not allowed to make changes in it. The second attribute, "no-step-in", means that the shell routine behaves as a coherent instruction and not as the sequence of instructions which it actually is. If the shell instruction is part of a user program, the shell routine is concealed to the user. When, for example, stepping the user program, no stepping in the shell routine's lists is performed if the "no-step-in" attribute is switched on, but the stepping only takes place in the robot instructions of the user program itself. When both of these attributes are switched on, the operator notices no difference between a shell instruction and a fixed robot instruction.

Figure 3:
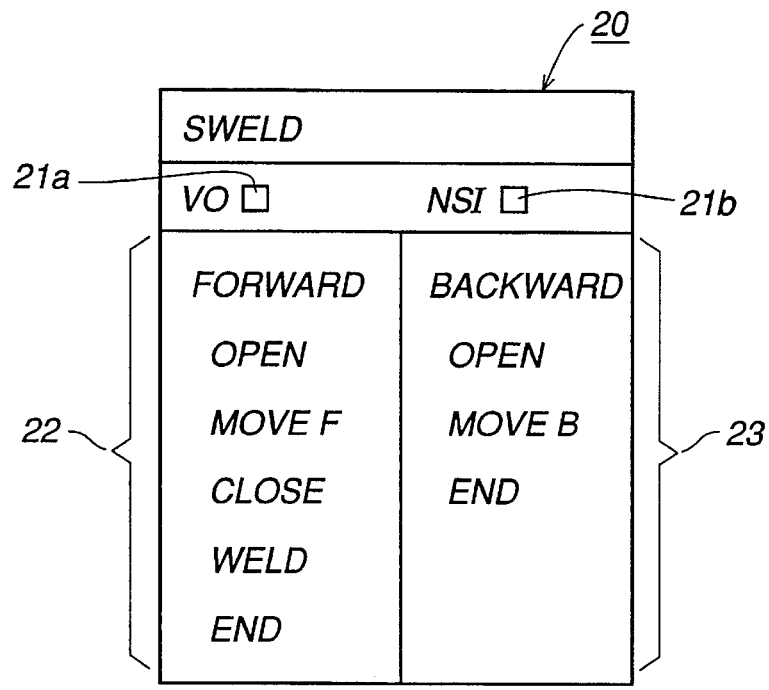
FIG. 3 shows an example of a shell routine.

FIG. 3 shows an example of a shell routine 20 with two attributes. The first attribute 21a consists of "view-only" (VO) and the second attribute 21b is "no-step-in" (NSI). Each shell routine has an individual name. The shell routine in FIG. 3 has the name SWELD and causes the robot to carry out a spot welding operation. The shell routine consists of two different lists of robot instructions, that is, one forward list 22, and one backward list 23. For the program executor to be able to find the forward list and the backward list, the forward list always starts with the word FORWARD and the backward list with the word BACKWARD. These words constitute reserved words in the robot language and may not be used in any other connection.

Figure 4:
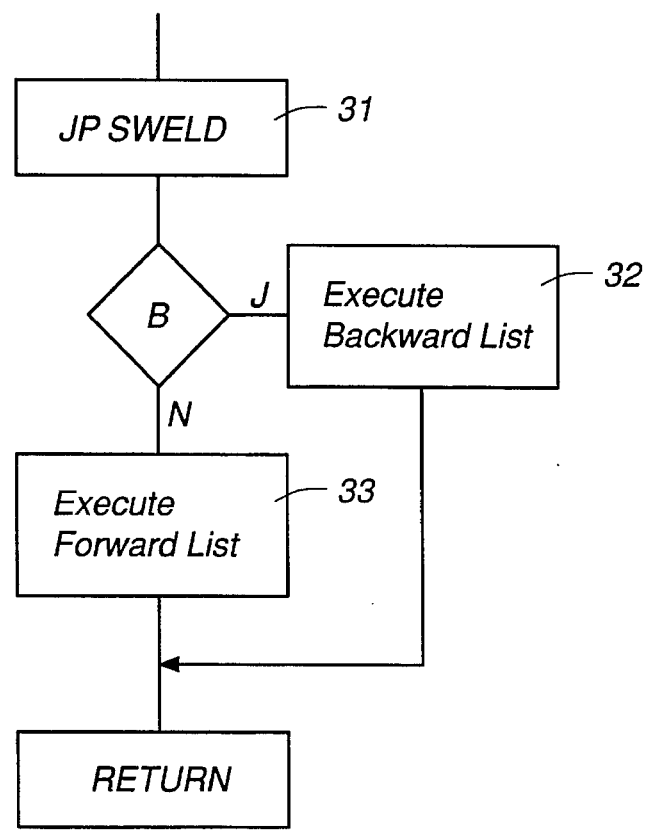
FIG. 4 shows in the form of a flow diagram an example of how the program executor executes a shell routine.

FIG. 4 shows, by way of a flow diagram, an example of the appearance of that part of the program executor which executes the shell routine in FIG. 3. When the program executor arrives at the instruction SWELD in the user program, it carries out in block 31 a jump to the shell routine SWELD which is stored in the program storage. If the program unit is set at backward, the instructions in the backward list are executed, block 32, otherwise the forward list is executed, block 33.

Figure 5:
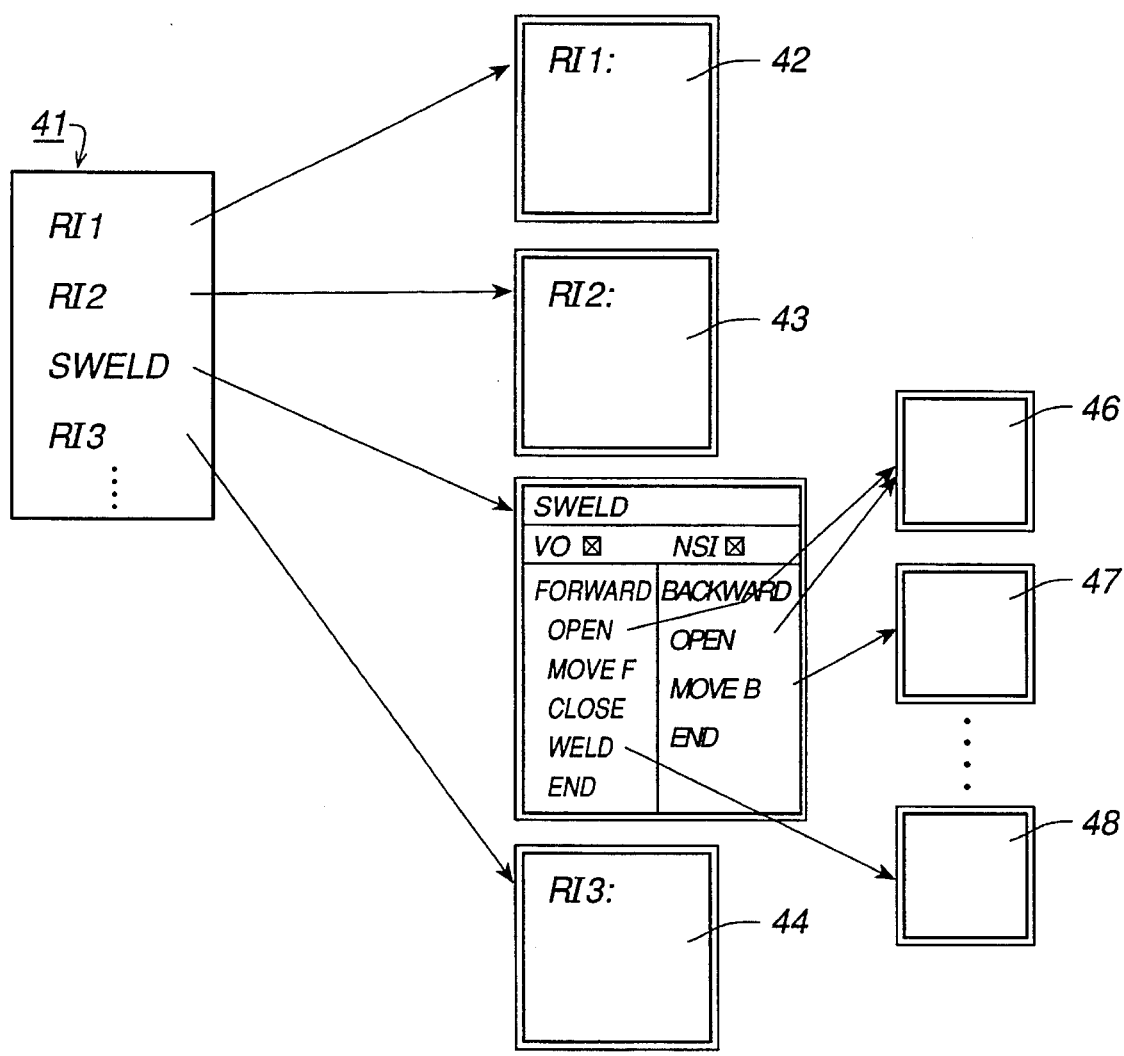
FIG. 5 schematically shows the configuration of a robot program with fixed instructions and shell instructions.

FIG. 5 shows an example of a user program 41 which comprises the shell instruction SWELD and the fixed robot instructions RI1, RI2 and RI3. When executing the fixed robot instructions, the corresponding fixed routines 42, 43 and 44 are called. When executing the shell instruction, the shell routine 45 is called, whereupon the backward list or the forward list is executed depending on whether the programming unit is set at forward or backward. The instructions in the shell routine consist of fixed robot instructions and when these are executed, fixed routines are called, for example 46, 47 and 48.

In the above examples the shell routine comprises a set of robot instructions where all the robot instructions are fixed instructions. A robot instruction in a shell routine may also consist of a shell instruction. A shell routine comprises a set of robot instructions, wherein a robot instructions may be either a fixed instruction or a shell instruction.

The forward list and the backward list may also contain logic clauses such as "if-then-else" clauses and "while" clauses.

The names of the forward and backward lists (FORWARD, BACKWARD) are there to distinguish between the two lists. In another embodiment, the name of the forward list (FORWARD) may be omitted. Unless backward execution has been requested, the forward list is always executed.

The control system described above comprises a compiler for translating the shell routines into an intermediate code or a machine code. In another embodiment, the compiler may be omitted, and then the executor instead carries out shell routines and user programs directly.

The shell routine in this embodiment has two attributes, but it is also possible to have more attributes.

In certain cases it is an advantage for the robot supplier to write those robot instructions which are to be supplied to the robot user in the form of shell instructions. Such a shell instruction may then be provided with an attribute, a so-called system attribute, which means that the module is stored more permanently in order to prevent unintentional erasure. Changes of the shell routine may then only be made by the robot manufacturer, or by a person authorized by the robot manufacturer. This attribute is stronger than the "view-only" attribute, which may, for example, be set by the program preparer to prevent the operator from making changes in the program.

Figure 6:
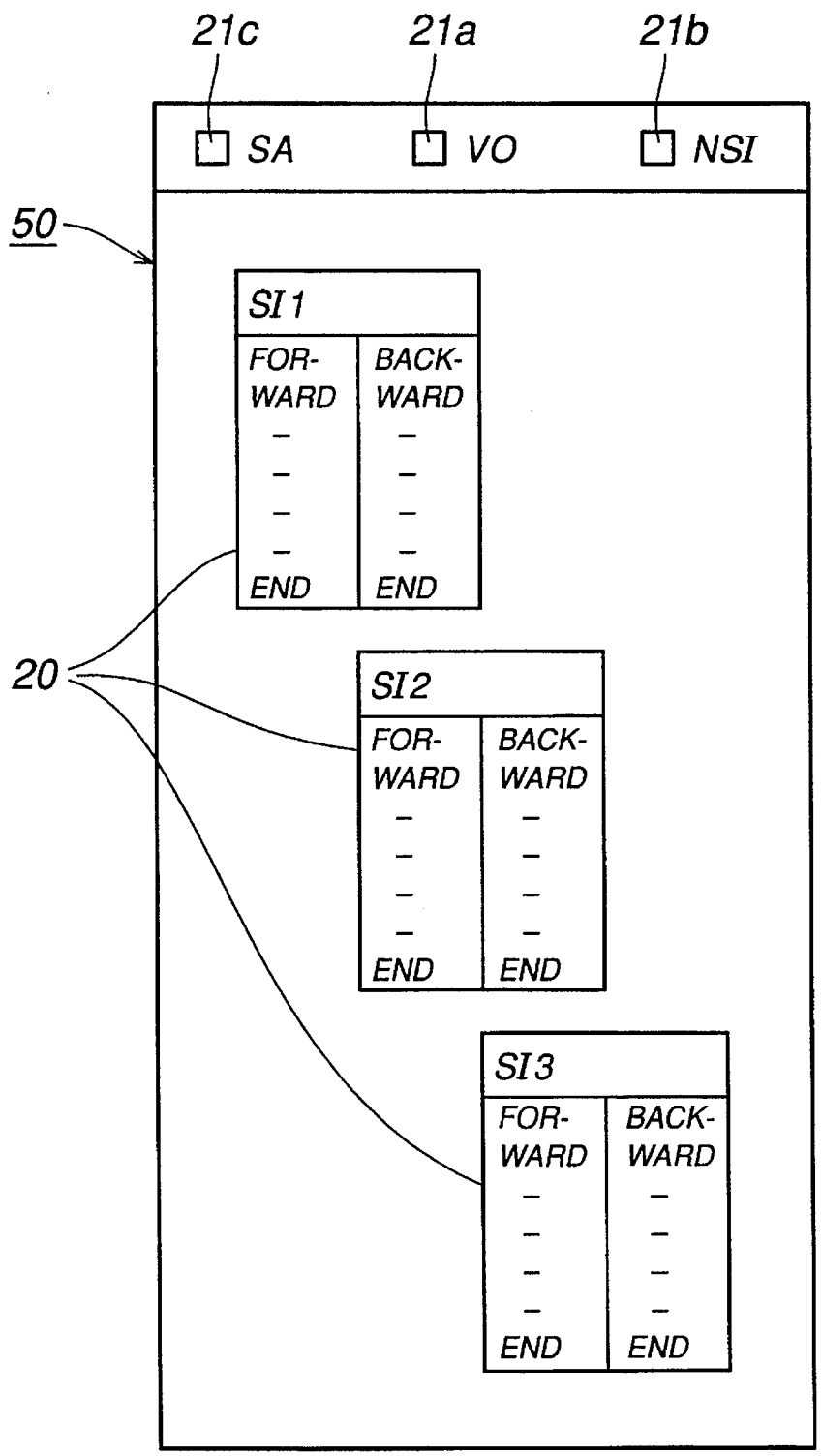
FIG. 6 shows an example of a plurality of shell routines which have been brought together into a module, with attributes common to these shell routines.

In another embodiment a plurality of shell routines may be brought together into one module with attributes common to these shell routines. FIG. 6 shows an example of a module 50 with three attributes, "view-only" (VO) 21a, "no-step-in" (NSI) 21b and system attribute (SA) 21c. The module comprises three shell routines 20 which are all associated with the common attributes.

We claim:

1. A control system for an industrial robot comprising a program executor and a program storage arranged for storing and executing a user program including a series of robot instructions, wherein at least one of the robot instructions is a shell instruction which constitutes a call to a shell routine comprising:

a forward list comprising a first set of robot instructions;

a backward list comprising a second set of robot instructions;

the shell routine being associated with a number of optional attributes which may be activated or deactivated; and the program executor is adapted for running the user program forward to execute the shell instruction in accordance with the forward list and for running the user program backwards, to execute the shell instruction in accordance with the backward list.

2. A control system according to claim 1, wherein the shell routine comprises an attribute (VO, SA) which when activated the shell routine may be read but is blocked for changes.

3. A control system according to claim 1, wherein the shell routine comprises an attribute (NSI) which when activated conceals the shell routine for the user.

4. A control system according to claim 1, wherein a plurality of shell routines are associated with the same attributes.

5. A method for controlling an industrial robot comprising:

creating a shell routine, being associated with a number of optional attributes which are deactivated during the creating of the shell routine, and comprising a forward list including a first set of robot instructions, and a backward list including a second set of robot instructions;

activating the attributes;

producing a user program comprising a series of robot instructions wherein at least one robot instruction is a shell instruction constituting a call to the shell routine;

executing the user program, and when running forwards the shell instruction is carried out in accordance with the forward list, and when running backwards the shell instruction is carried out in accordance with the backward list.

* * * * *